April 29, 1941.   A. N. ROTH   2,240,079
ELECTRICALLY CONTROLLED GAS VALVE
Filed March 14, 1939   2 Sheets-Sheet 2

INVENTOR:
ADOLF N. ROTH
BY
ATTORNEY

Patented Apr. 29, 1941

2,240,079

UNITED STATES PATENT OFFICE 2,240,079

ELECTRICALLY CONTROLLED GAS VALVE

Adolf N. Roth, San Francisco, Calif.

Application March 14, 1939, Serial No. 261,755

1 Claim. (Cl. 137—139)

This invention relates to improvements in electrically controlled gas valves and, more particularly, to slow-opening gas valves.

In many instances it is desirable to avoid an initial rapid delivery of fuel gas to gas burners to insure against explosive ignition of the gas, blowing out of the pilot flame, and other considerations. To accomplish this end, diaphragm operated gas valves have been generally adopted in this art, wherein opening of the valve is effected at the desired slow rate by adjustably restricting the admission of the operative gas pressure into the diaphragm chamber. In closing the valve the gas impounded in the diaphragm chamber is conducted therefrom through a special vent line to the burner chamber.

It is the purpose of the present invention to remedy the principal defects of conventional slow opening gas valves.

Among the objects of the invention is to bleed the impounded gas pressure from the diaphragm chamber in closing the valve through the delivery side of the valve to the gas burner. This obviates the expense of providing a special vent line for the purpose, as necessary heretofore, thus materially reducing the expenditure of skilled labor in installing the valve.

Another object is to so design the gas valve that it will be unaffected by transient fluctuations of the pressure in the service main.

Another object is to provide means for closing the gas valve at a predetermined rate so as to avoid abrupt cutting off of the gas flow to the burner with consequent explosive extinction of the gas flame.

A further object is to render the structure reliable in operation and simple and inexpensive of manufacture.

Other objects and advantages appear as this description progresses.

In this specification and the accompanying drawings, the invention is disclosed in its preferred form; but it is to be understood that it may be embodied in other forms within the purview of the claim following the description.

Figure 1:
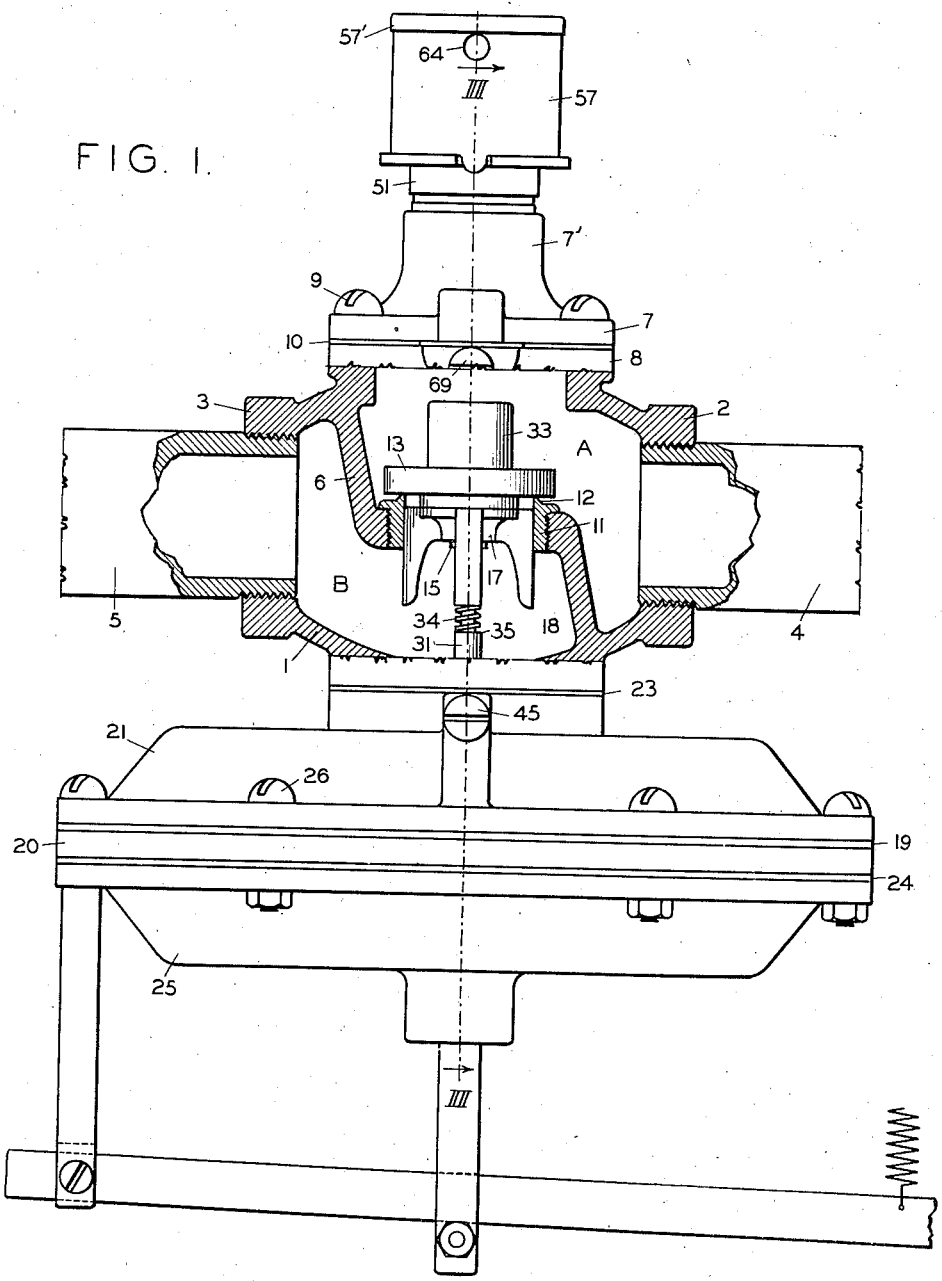
Fig. 1 is a side elevation, partly in vertical section, of a gas valve constructed in accordance with the present invention.
Figure 2:
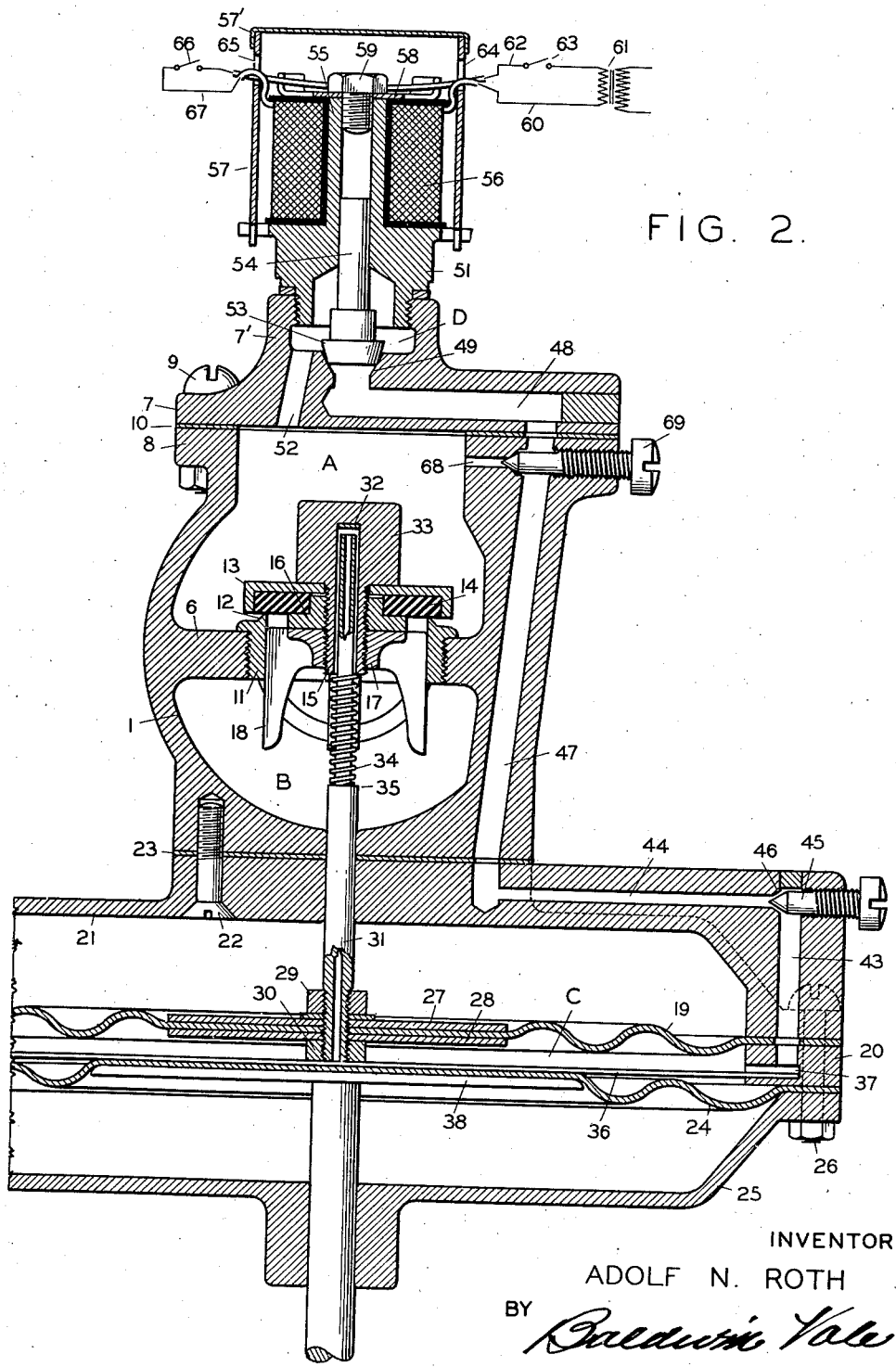
Fig. 2 is a vertical section, somewhat enlarged, of the same taken along the line II—II, Fig. 1.

In detail, the construction illustrated in the drawings comprises the hollow valve body 1 having the inlet 2 and the outlet 3 at its opposite ends into which the pipes 4 and 5 are screwed. These pipes communicate respectively with the fuel gas service main and the gas burner, not shown, the fuel supply of which is controlled by the present valve. The partition 6 divides the interior of the valve body 1 into the inlet chamber A and the delivery chamber B. The inlet chamber A extends upwardly through the top of the valve body 1 and is closed by the cover 7 which is secured to the flange 8 of the body 1 by the bolts 9. The gasket 10 is interposed between the cover 7 and the flange 8 to prevent gas leakage. The annulus 11, threaded in the partition 6, has the annular valve seat 12 formed at its upper end. The valve member 13 is recessed to receive the fiber washer 14 which is adapted to engage the seat 12 to cut off communication between the chamber A and B. The neck 15 extends downwardly through the valve member 13 and has the nut 16 screwed thereon to securely retain the washer 14 within the valve member 13. The lock nut 17, threaded on the lower end of the neck 15, has the spider 18 radiating therefrom, which slidably engages the interior of the annulus 11 to guide the descent of the valve.

The valve is operated by the diaphragm 19 which has its margins clamped between the annulus 20 and the shell 21 which is secured to the bottom of the body 1 by screws such as 22. The gasket 23 is interposed between the shell 21 and the body 1 to prevent gas leakage therebetween. The auxiliary diaphragm 24 has its edges clamped between the annulus 20 and the lower shell 25, thus forming the chamber C between the diaphragms. The marginal flange of the shell 21, the annulus 20, and the lower shell 25 are all drawn together by bolts such as 26 extending therethrough.

The central portion of the diaphragm 19 is confined between the disks 27 and 28 which are clamped together between the nuts 29 and 30 threaded on the tubular stem 31. The stem 31 is thus attached to the diaphragm 19 with its hollow interior communicating with the chamber C. The stem slidably extends upwardly through the top of the shell 21 and the bottom of the body 1. The neck is hollow and receives the upwardly projecting end of the stem 31. The fibrous washer 32 is provided within the head 33 of the stem 31 in juxtaposition to the end of the stem 31 and is adapted to be engaged thereby to seal the stem against gas flow therethrough when the valve is in operative position, as hereinafter described.

The spring 34 encircles the stem 31 and expands between the lower end of the neck 15 and the shoulder 35 intermediate the length of the stem. This spring urges the stem 31 downwardly to normally maintain the end of the stem disengaged from the washer 32 so as to permit flow of gas from the chamber C, through the stem 31 and the neck 15, into the outlet chamber B when the valve is closed, as shown in the drawings.

When the diaphragms are inoperatively collapsed, the diaphragm 19 rests on the bar 36 extending across the diaphragm chamber C and having its ends supported within notches such as 37 in the annulus 20.

Gas under pressure is supplied to the diaphragm chamber C through the passage 43 which discharges into the notch 37 and communicates with the horizontal passage 44 in the shell 21. The needle valve 45 is threaded in the shell 21 and cooperates with the tapered seat 46 provided at the intersection of the passage 43 within the passage 44 to regulate the rate at which the gas is delivered to the chamber C. The duct 47 leads upwardly through the body 1 from the passage 44 and connects with the passage 48 provided in the cover 7.

The cover 7 has the boss 7' projecting upwardly therefrom, into which the bushing 51 is screwed, leaving the chamber D within the boss. The passage 52 through the cover 7 provides communication between the inlet chamber A and the chamber D. The tapered valve seat 49 at the bottom of the chamber D communicates with the passage 48 but is normally closed by the frusto-conical valve 53 resting thereon. The stem 54 of this valve is slidably guided within the hollow hub 55 of the bushing 51.

The valve 53 is magnetically operated by the solenoid 56 which encircles the hub 55. To this end, the valve 53 and its stem 54 are composed of soft iron, while the bushing 51 is of non-ferromagnetic material. The solenoid 56, when energized, will thus attract the stem 54 and unseat the valve 53. The solenoid 56 is held on the hub 55 by the bolt 59 and is enclosed with the cylindrical housing 57 which is fixed on the spider 58 interposed between the solenoid 56 and the bolt 59. The top of the housing 57 is closed by the cover 57'.

The solenoid 56 is usually automatically controlled by a conventional thermostat or pressurestat, although a manual switch may be used if desired. The wire 60 is connected to one side of the solenoid 56 and leads through the hole 64 in the housing 57 to a suitable source of current such as the transformer 61, and is connected to the wire 62 through the switch 63 which can be operated by any suitable thermostatic or pressurestatic control. The wire 62 may be directly connected to the opposite side of the solenoid 56. However, it is usual to interpose a thermo-switch in the circuit of the solenoid which is controlled by the heat of the pilot flame in the combustion chamber. Should the pilot light be extinguished for any reason, the circuit of the solenoid would thus be broken, preventing opening of the gas supply valve and insuring against the dangerous and wasteful release of unignited gas. In this case, the wire 62 extends across the housing 57 through the hole 65 on its opposite side and is connected to the thermo-switch 66. The wire 67 connects the opposite pole of the switch 66 to the solenoid 56. The wires 60, 62, and 67 are preferably enclosed within conduits, not shown, well known in the electrical art. The present provision of the multiple openings 64 and 65 in the housing 57 obviates the necessity for providing an auxiliary outlet box as has been usual in practice heretofore.

The by-pass 68 provides communication between the chamber A and the duct 47 but is normally closed by the needle valve 69. In the event of power failure or failure of the automatic control means, the valve structure may be operated by manual manipulation of the needle valve 69 as will hereinafter be described.

The invention operates substantially as follows: When conditions warrant opening the present valve supplying fuel gas to the burner, the switch 63 is closed by its automatic control means or manually. Current then flows from the source 61 across the closed switch 63 and the normally closed thermo-switch 66, through the solenoid 56, and back to the source 61. The solenoid 56, thus energized, attracts the stem 54 and unseats the valve 53. Gas at service main pressure then flows from the inlet chamber A through the passage 52, past the unseated valve 53, through the passage 48, the duct 47, the passage 44, and past the needle valve 45, and through the passage 43 to the diaphragm chamber C.

Since the end of the tubular stem 31 is normally disengaged from the washer 32, a relatively small amount of gas flows from the chamber C, through the stem 31 and the hollow bolt 15 into the outlet chamber B. However, since the amount of the gas thus discharged from the chamber C is less than the amount being supplied thereto through the passage 43, the pressure in the chamber C gradually rises. The diaphragm 19 is then expanded upwardly and raises the stem 31, compressing the spring 34, until the upper end of the stem 31 engages the washer 32 and cuts off the flow of gas therepast.

The continued expansion of the diaphragm 19 then raises the valve 13 at a speed which is predetermined by the adjustment of the needle valve 45 which regulates the rate the gas is delivered to the chamber C, as previously described. The optimum speed of the opening of the valve 13 will vary with the particular type of burner and combustion chamber in conjunction with which the valve is used. At the end of the opening cycle, further movement of the valve 13 is arrested by the head 33 engaging the cover 7.

The impounded pressure in the diaphragm chamber C, which has been closed by the end of the stem 31 engaging the seat 32, then builds up to service main pressure which is higher than the pressure required to open the valve 13 to its fullest extent. The maintaining of the chamber C at a pressure in excess of the pressure required to open the valve insures the valve remaining open to its maximum extent despite pressure drops at C due to transient variations in service main pressure.

When conditions render it desirable to close the valve 13, the switch 63 is opened by its control means, thus de-energizing the solenoid 56. The valve 53, being no longer attracted, descends under its own weight and seats itself at 49, cutting off the diaphragm chamber C from communication with the inlet chamber A. The pressure in the chamber C then falls slightly due to diffusion through the diaphragms and to other inevitable slow leaks. This allows the diaphragm 19 to descend slightly under the tension of the spring 34, lowering the end of the stem 31 from engagement with the seat 32. Gas then is bled from the chamber C through the tubular stem 31 and flows down the hollow bolt 15 into the outlet chamber B. The consequent gradual reduction of pressure in the chamber C permits the diaphragm 19 to contract, allowing the valve 13 to descend under its own weight. The spider 18 guides this descent of the valve 13 which finally seats itself at 12 as shown in the drawings. The rate of the closing of the valve 13 depends upon the capacity of the tubular stem 31 which bleeds the chamber C. Since the optimum rate of the closure of the fuel gas valve is substantially equal for all the common types of gas furnaces, the rate of the bleeding of the chamber C can be predetermined by selecting appropriate internal dimensions for the hollow stem 31 without the necessity for providing means for adjusting this flow.

In the event of electric power failure, the gas valve can be operated by manual manipulation of the bypass needle valve 69. Opening this valve allows gas to flow from the chamber A through the passages 68, 47, 44, and 43, to the chamber C. The diaphragm 19 then expands and operates the valve 13 in the manner hereinbefore described.

Having thus described this invention, what I claim and desire to secure by Letters Patent is:

A fuel valve comprising a body having an inlet chamber and an outlet chamber separated by a partition; a valve seat formed in the partition; a valve head in cooperative relation with said seat normally held seated by fluid pressure in the inlet chamber; a recess in said valve head opening into the outlet chamber; a pressure chamber having a movable diaphragm; a hollow stem connected at one end to said movable diaphragm and communicating with the interior of the pressure chamber, the other end of said stem extending into the recess formed in the valve head; means to normally space the end of said stem within the recess from the bottom of the recess; a passage from said inlet chamber to the pressure chamber; and means in said passage to control the admission of pressure fluid from the inlet chamber to the pressure chamber, the flow capacity of said passage being greater than that of the hollow stem, whereby the valve is opened and flow through said stem shut off when sufficient fuel under pressure is admitted to the pressure chamber.

ADOLF N. ROTH.